Jan. 15, 1963 H. M. PENNINGROTH 3,074,051

DECODER MECHANISM

Filed March 16, 1959 2 Sheets-Sheet 1

INVENTOR.
Herbert M. Penningroth
BY
Paul J. Ethington
ATTORNEY

Jan. 15, 1963 H. M. PENNINGROTH 3,074,051

DECODER MECHANISM

Filed March 16, 1959

2 Sheets-Sheet 2

INVENTOR.
Herbert M. Penningroth

BY

Paul J. Ethington

ATTORNEY

United States Patent Office 3,074,051
Patented Jan. 15, 1963

3,074,051
DECODER MECHANISM
Herbert M. Penningroth, Hales Corners, Wis., assignor to General Motors Corporation, Detroit, Mich., a corporation of Delaware
Filed Mar. 16, 1959, Ser. No. 799,524
1 Claim. (Cl. 340—164)

This invention relates to selective signaling systems and more particularly to a selective ringing decoder mechanism responsive to a predetermined call signal.

In communications and control systems with multiple receiving stations, it is a usual practice to utilize common circuits or carrier frequencies for all stations and to employ distinctive call signals for selecting a particular station. In a conventional system, the call signals, like the well known dial telephone numbers, are represented by different permutations of a group of intergers, such as 2 through 10. Typically, a call signal is formed by taking five integers at a time, such as 5—2—7—8—3, to permit a very large number of stations to be selectively operated in the same network.

In wired networks, the call signals may be transmitted as successive electrical pulse trains in which each pulse train corresponds to an integer signal. For radio transmission, the call signals are commonly encoded by successively alternating an electrical signal between two given frequencies with a number of alternations corresponding to the value of the call signal integer and with a prolonged delay or space between alternations to separate the integer signals. Conventionally, the call signal is encoded by alternate 600 c.p.s. and 1500 c.p.s. tone frequencies with a frequency transition at approximately every 100 milliseconds within an integer signal and a space of approximately 500 milliseconds between successive integer signals. At the reciving station, translating means convert the alternate frequency signals to pulse signals for application to a selector device or decoder mechanism which responds only to an assigned call signal to complete a control circuits or ringing circuit of a signal device which alerts an operator to a forthcoming message transmission.

The decoder mechanism translates the electrical pulse signals to step-by-step displacement of a control device, such as a code wheel with ratchet teeth, in which the assigned call signal is established by code pins spaced by a number of teeth or steps equal to the corresponding integer signal. In prior art decoder mechanisms, a single electromagnet is energized by the pulses and a fast-acting armature thereof actuates a driving pawl coacting with the ratchet teeth on the code wheel to advance it one step for each pulse and a magnetic time delay armature on the electromagnet actuates a holding pawl which retains the wheel in its advanced position during and after a correct pulse train. Such a time delay is usually accomplished by the use of a heavy copper slug on the electromagnet core to limit the rate of flux change and thereby delay the actuation of the armature. Such an arrangement is designed for a constant time delay and so the response of the decoder is limited to a narrow range of pulse repetition rate. The prior art decoder systems are expensive to manufacture and service and are not well adapted for many applications, particularly mobile radio receivers, because the complex mechanism is heavy and requires excessive space.

It has been found, in accordance with this invention, that the prior art decoder mechanisms may be greatly simplified and yet afford more versatile operation by mechanically and electrically separating the decoding actuator and stepping actuator. This is accomplished by the use of stepping actuators and decoder actuators having separate electromagnets for the driving and retaining pawls respectively with the code wheel disposed therebetween to provide a common plane of motion for the reciprocation of the electromagnet armatures and the rotation of the code wheel. The separate electromagnets permit the decoder mechanism to accept call signals having a wide variation in pulse repetition rate. This arrangement permits a very light weight and compact design with the entire mechanism mounted on a single support deck which facilitates manufacturing assembly and maintenance as well as easy access to the code wheel for changing the assigned call number.

A more complete understanding of this invention may be had from the detailed description which follows taken from the accompaning drawings in which.

Figure 1:
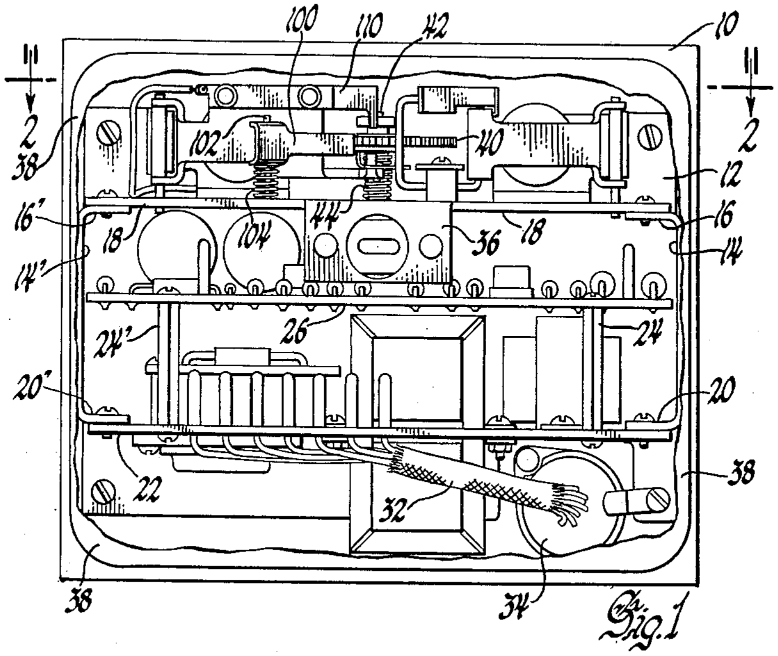
FIGURE 1 is an elevation view of the decoder mechanism with the cover partially removed.

Referring now to the drawings, there is shown an illustrative embodiment of the invention in a decoding unit adapted for use with a radio receiver in a network using conventional alternate tone frequency call signals. As shown in the block diagram 1 of FIGURE 4, a typical call signal, such as 5—5—2—7—4, is composed of alternate tone frequencies $f_1$ and $f_2$. Each integer signal is represented by a number of tone transitions equal to the integer and successive integers are separated by a prolonged pause or space. A single tone transition at the end of a call signal is used for a clearing pulse to reset the decoding unit for reception of a succeeding call signal. In the decoding unit, an electronic circuit converts the tone frequency transitions to electrical pulses to provide successive integer signal pulse trains 2 with individual stepping pulses which are of lesser duration than the interval between the tone transitions within an integer signal and to provide decoding pulses 3 which continue throughout each integer signal pulse train. The electronic circuit of the decoding unit may be of the type disclosed and claimed in copending application Serial No. 799,650 filed March 16, 1959 by James D. Malone and Arthur J. Runft for "Selective Ringing Decoder System." The inventive decoder mechanism of the decoding unit responds to a predetermined call signal composed of the stepping and decoding pulses to complete an electrical signaling or ringing circuit.

The decoding unit comprises a support plate 10 to which is secured a U-shaped mounting bracket 12 for supporting both the decoder mechanism and the electronic circuit components within a single housing. The bracket 12 has its base secured to the plate 10 and a pair of oppositely disposed side plates 14 and 14′ which terminate at their upper ends in flanges 16 and 16′ supporting an upper plate or deck 18. The lower ends of the side plates 14 and 14′ terminate in flanges 20 and 20′ respectively which support a lower deck 22. A pair of support posts 24 and 24′, seated on the lower deck 22, support an intermediate deck 26. The lower deck 22 and the intermediate deck 26 are printed circuit boards upon which are mounted the various components of an electronic circuit for converting an alternate frequency tone signal to a pulse signal. External connection from the electronic circuit is provided through a cable 32 and plug connector 34. The upper deck 18 is a metal plate and includes a latch 36 for a removable cover 38. The upper deck supports the inventive decoder mechanism which will be described in detail presently.

Figure 5:
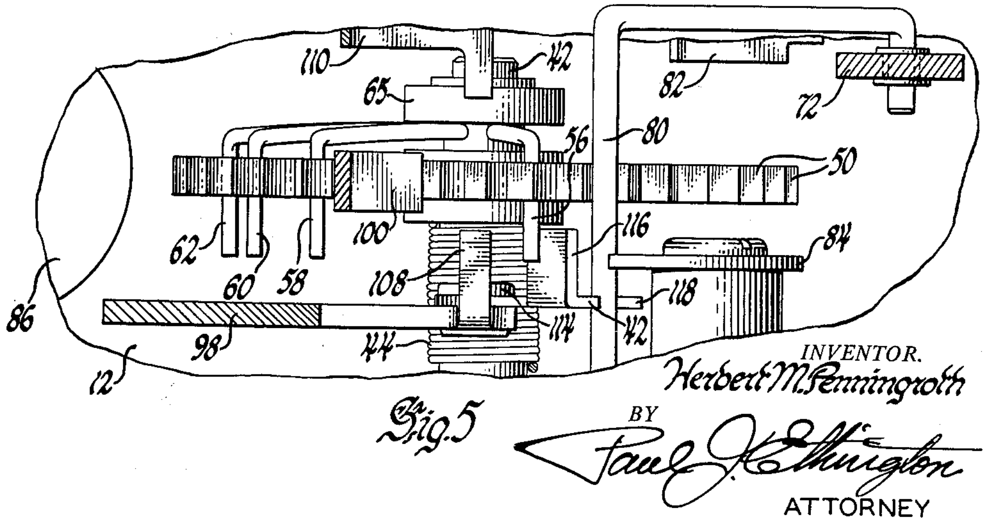
FIGURE 5 is a view taken on lines 5—5 of FIGURE 3.

The decoder mechanism comprises a code wheel 40 rotatably mounted upon a shaft 42 which is secured to the upper deck 18. The code wheel is resiliently urged by a return spring 44 in a clockwise direction toward a reference position in which a depending pin 46 on the wheel engages an eccentric stop pin 48, adjustably mounted on the deck 18. The code wheel is provided with a plurality of equally spaced peripheral teeth 50 and corresponding apertures 52 extending through the code wheel at the base of the respective teeth. The call signal assigned to the particular decoder is established by the locations, relative to a reference tooth 54, of a plurality of code pins 56, 58, 60, 62 and 64. For the call signal 5—5—2—7—4, taken as an example, the code pin 56 is positioned five teeth in advance of the reference tooth, code pin 58 is positioned five teeth in advance of code pin 56 and so forth. Each of the code pins 56, 58, 60 and 62 are suitably formed of spring wire and extend radially from a hub 65 toward the respective tooth and thence through the corresponding aperture and project through the code wheel as shown in FIGURE 5. The final code pin 64 is a thin metal arm provided with an upwardly extending contact element 66 constituting one of the contacts of the control or ringing circuit.

In order to advance the code wheel step-by-step in accordance with the integer signals, there is provided a stepping actuator having an electromagnet 68 energized by the stepping pulses. This electromagnet is secured to the deck 18 and provided with a field frame 70 upon which is pivotally supported a U-shaped stepping armature 72 by a pivot pin 74. The armature 72 is resiliently urged away from the electromagnet core by a leaf spring 76 having one end mounted on the field frame and with the other end bearing against a stud 78 at one side of the armature 72. A driving pawl 80, of U-shaped configuration and suitably formed of wire, is pivotally mounted on the other side of the armature 72. The free end of the pawl 80 is urged toward engagement with the periphery of the code wheel by a leaf spring 82 secured to the armature. The pawl 80 is adapted to engage the adjacent tooth of the code wheel and when the electromagnet 68 is energized with a stepping pulse, the armature 72 is pulled-in to impart a driving stroke to the pawl 80. The driving stroke advances the code wheel the distance of one tooth in a counterclockwise direction until the pawl engages a stop plate 84 mounted on the deck 18.

Figure 4:
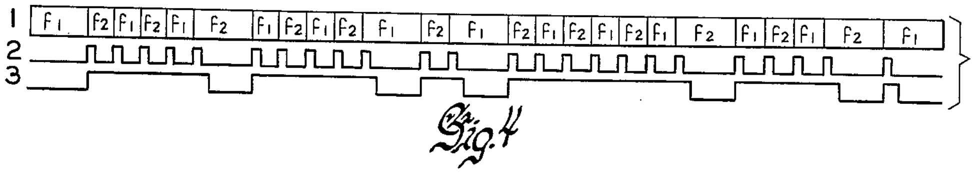
FIGURE 4 is a graphical representation of a typical call signal.

In order to retain the code wheel in its advanced position between pulses of an integer signal and thereafter only if the correct number of pulses have been applied, there is provided a decoding actuator which includes an electromagnet 86 energized with the decoding pulses. This electromagnet is secured to the deck 18 and is provided with a field frame 88 upon which is pivotally mounted an L-shaped armature 90 by a pivot pin 92. The armature 90 is resiliently urged away from the core of the electromagnet by a leaf spring 94 having one end secured to the field frame and the other end bearing against a stud 96 on the armature. The armature 90 carries an actuating plate 98 which extends beneath the code wheel. A retaining pawl 100 is pivotally mounted upon a pin 102 secured in the deck 18 and is resiliently urged toward engagement with the periphery of the code wheel by a coil spring 104. The actuating plate 98 includes a shoulder 106 which engages the pawl 100 when the armature 90 is dropped-out and displaces the pawl from engagement with the code wheel. The actuating plate 98 also includes a latch or tab 108 which extends toward the code wheel beyond the projecting ends of the code pins. When the armature 90 is pulled-in, as shown in FIGURE 4, during an integer signal, the shoulder 106 is displaced inwardly to permit the retaining pawl 100 to engage the periphery of the code wheel and ratchet over the teeth thereof to retain the wheel in its advanced position between pulses of the integer signal. In this position, the tab 108 is displaced inwardly of the wheel sufficiently to permit the code pins to pass without interference. At the end of the integer signal when the decoding pulse ends and armature 90 drops out, the retaining pawl 100 is displaced from the periphery of the code wheel by the shoulder 106. If any of the code pins 56, 58, 60 or 62 is located at the reference position, the tab 108 engages the code pin and retains the armature 90 in an intermediate position. In this position, the tab 108 interferes with the arcuate motion of the engaged code pin and the retaining pawl remains in alignment with the adjacent tooth to prevent retrograde motion of the code wheel under the influence of the return spring 44. If the final code pin 64 is located at the reference position at the end of an integer signal, a ringing contact 110 which is mounted on the armature 90 engages the ringing contact 66 and retains the armature in the intermediate postion. The contact 110 interferes with the arcuate motion of the contact 66 and the retaining pawl remains in alignment with the adjacent tooth and thus the code wheel is retained in its advanced position. The ringing contacts 66 and 110 complete an energizing circuit for a signal device, such as a bell or lamp, not shown.

Provision is made in the decoder mechanism to prevent a single integer signal from advancing a code pin beyond the reference position and thus to avoid false response to call signals in which one integer is equal to the sum of two or more successive integers in the assigned call signal. Without such provision, for example, the decoder mechanism having an assigned call signal of 5—5—2—7—4 would respond to a call signal 5—7—7—4—3 since the first integer signal 5 would advance the code wheel to the first code pin and the second integer signal 7 would advance the code wheel directly to the third code pin without stopping at the second. The third and fourth integer signals, 7 and 4, would advance the code wheel successively until the code wheel contacts 66 and 110 were closed to complete the ringing circuit for the signal device. To prevent this false response, a blocking lever 112 is pivotally mounted by a pivot pin 114 on the inner end of the actuating plate 98. The blocking lever includes a tab 116 extending toward the code plate beyond the projecting ends of the code pins. When the armature 90 is pulled-in during an integer signal, the tab 116 is disposed in the path of the ends of the code pins. When the number of stepping pulses in the received call signal integer corresponds to the integer signal assigned to the particular decoder, the code pin is advanced to the reference position and immediately adjacent the tab 112. When the armature 90 drops out at the end of the integer signal, the blocking lever 112 is moved outwardly so that the tab 116 is out of the path of the code pin and upon receipt of the succeeding integer signal, the code pin passes by the tab on the blocking lever without interference. If, however, the number of stepping pulses in the received integer signal exceeds that of the assigned call signal, the code pin is advanced beyond the reference position and engages the tab 116 and rotates the blocking lever in a counterclockwise direction. This positions the cam surface 118 thereon in the path of the driving pawl 80 and engagement of the pawl with the adjacent tooth of the code wheel is prevented. Consequently, at the end of the integer signal when the armature 90 drops out, the code wheel returns to its reference position.

Figure 2:
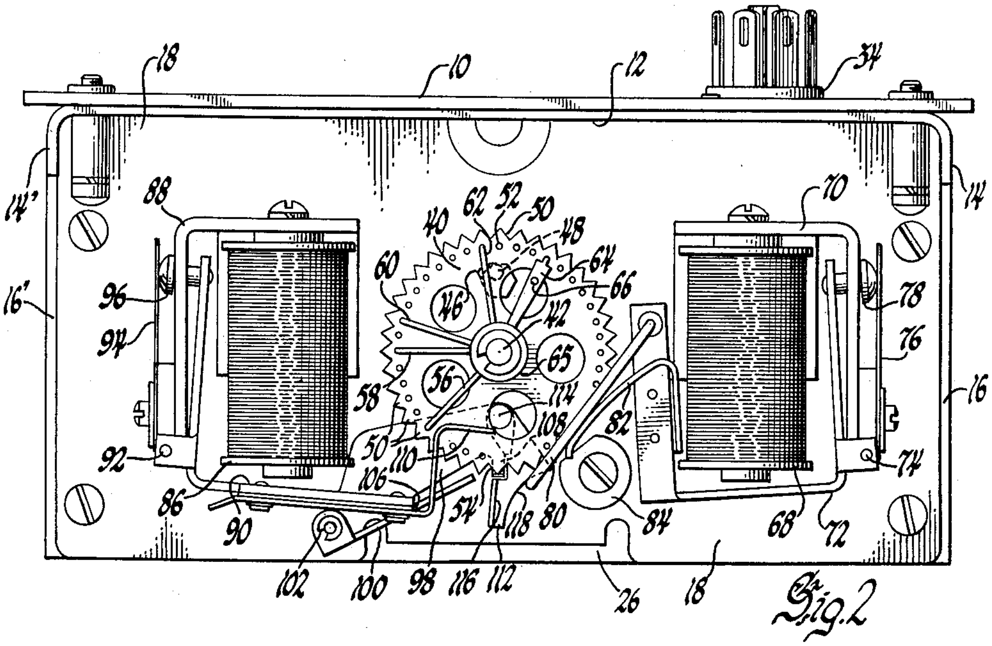
FIGURE 2 is a view taken on lines 2—2 of FIGURE 1.
Figure 3:
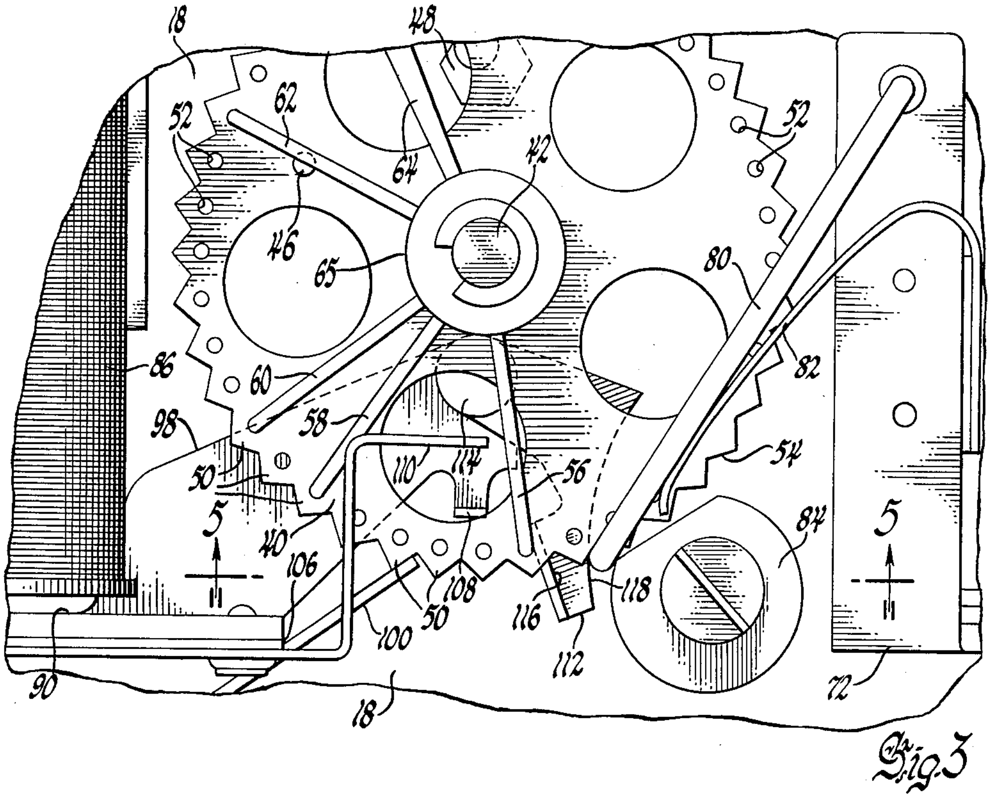
FIGURE 3 shows details of construction.

In operation of the decoder mechanism, assume that the assigned call signal 5—5—2—7—4 is received and the corresponding stepping pulse trains 2 are applied to the stepping actuator electromagnet 86 and the corresponding decoder pulses 3 are applied to the decoder actuator electromagnet 68. Initially, the armatures of both electromagnets are dropped out as shown in FIGURE 2 and upon receipt of the first pulse of the first integer signal 5, both armatures are pulled-in simultaneously to the position shown in FIGURE 4. The stroke imparted to the driving pawl 80 causes it to engage the adjacent tooth of the code wheel and advance the code wheel a distance of one tooth. With the armature 90 pulled-in, the retaining pawl 100 ratchets over the adjacent tooth and prevents retrograde motion of the code wheel. The succeeding pulses of the first integer signal 5 advance the code wheel step-by-step until the code pin 56 is in the reference position and at the end of the last pulse, the armature 72 of the stepping actuator drops out. Subsequently, the armature 90 of the decoding actuator drops out and the tab 108 on the actuating plate 98 engages the end of the code pin 56 and holds the armature 90 in its intermediate position. In this position, the retaining pawl 100 remains aligned with the adjacent tooth and, together with the interfering engagement of the tab 108 with the code pin, prevents return of the code wheel to its reference position.

(If the received integer signal contains fewer pulses than that assigned to the decoder mechanism, the code wheel advancement will not locate a code pin at the reference position and at the end of the integer signal the armature 90 will drop out completely, allowing the code wheel to return to its reference position. If the received integer signal contains more pulses than that assigned to the particular decoder, the code wheel will be advanced until the code pin pivots the blocking lever 112 and moves the came surface 118 into the path of the driving pawl 80 to prevent further advancement of the code wheel. Upon termination of the integer signal, the decoding armature 90 will drop out completely, permitting the code wheel to return to its reference position.)

Upon receipt of the succeeding integer signal 5, the stepping actuator and decoding actuator are operated in a similar manner to advance the code pin 58 to the reference position. Similarly, the succeeding integer signal 2 advances the code pin 60 to the reference position, the integer signal 7 then advances the code pin 62 to the reference position, and the final integer signal 4 advances the final code pin 64 to the reference position. Upon termination of the decoding pulse, with the code pin 64 in the reference position, the armature 90 drops out until the contact 110 engages the contact 66 to hold the armature 90 in its intermediate position and prevent return of the code wheel to its reference position. The engagement of contacts 110 and 66 completes an energizing circuit for the signal device to alert the operator to a forthcoming message transmission. After the final integer signal, a single clearing pulse advances the code wheel one step, and when the decoding armature 90 drops out, the retaining pawl 100 is displaced from the code wheel and the code wheel returns to its reference position in readiness for a succeeding call signal.

Although the description of this invention has been given with respect to a particular embodiment, it is not to be construed in a limiting sense. Numerous modifications and variations within the spirit and scope of the invention will now occur to those skilled in the art. For a definition of the invention, reference is made to the appended claim.

I claim:

A control device responsive to an assigned integer type call signal composed of successive stepping pulse trains corresponding to each integer and decoding pulses continuing during each pulse train, said device comprising a support plate, a code wheel rotatably mounted on one side of the plate and having equally spaced peripheral teeth, means interposed between the code wheel and the support plate for biasing the code wheel toward a reference position, a stepping electromagnet including a stepping armature mounted adjacent the code wheel on the plate and adapted to receive said one side of the stepping pulses, said stepping armature being pivotal about an axis parallel to the axis of rotation of the code wheel and being actuated in response to each stepping pulse, a driving pawl pivotally mounted on the armature and resiliently urged toward engagement with the periphery of the code wheel to advance the code wheel one tooth each time the stepping armature is actuated, a decoding electromagnet including a decoding armature mounted adjacent the code wheel and opposite the stepping electromagnet on said one side of the plate and adapted to receive the decoding pulses, the decoding armature being pivotal about an axis parallel to the axis of rotation of the code wheel and actuated by the decoding electromagnet during each decoding pulse, a latch element and an electrical contact mounted on said decoding armature at a reference position adjacent said code wheel, said latch element and contact being disposed on opposite sides of said code wheel and movable radially thereof with said decoding armature, plural code pins secured to said code wheel adjacent selected teeth located in succession from the tooth at the reference position in accordance with the successive integers of the call signal, a retaining pawl pivotally mounted on the plate and resiliently urged toward engagement with the periphery of the code wheel, said retaining pawl being in the path of movement of the decoding armature so that the retaining pawl is displaced from the code wheel periphery when the electromagnet is deenergized and engages the periphery of the code wheel when the decoding electromagnet is energized whereby the code wheel is retained in its advanced position during an integer signal, said stepping electromagnet and said decoding electromagnet being of the same construction type so that they exhibit the same rate of response to the application of pulses of the same shape, the first and intermediate code pins being successively positioned at said reference position by the successive integer signals of the assigned call signal and coacting with said latch element to retain the code wheel in its advanced position between integer signals, the last code pin being positioned at said reference position by the final integer signal of the assigned call signal and coacting with said electrical contact to complete an electric circuit and to retain said code wheel in its advanced position after the final integer signal, a lock-out lever pivotally mounted on the decoding armature and movable therewith radially of the code wheel, a tab on the lock-out lever adjacent said reference position and disposed in the path of said code pins when the decoding electromagnet is energized whereby the lock-out lever is pivotally displaced by movement of a code pin beyond the reference position before the decoding electromagnet is deenergized, a cam surface on the lock-out lever adjacent the driving pawl and movable into the path thereof to prevent driving engagement of the pawl with the code wheel when the decoding armature is energized and the lock-out lever is pivotally displaced by a code pin, thereby preventing false response of the control device to a call signal having an integer equal to the sum of two or more successive integers in the assigned call signal.

References Cited in the file of this patent

UNITED STATES PATENTS

| | | |
|---|---|---|
| 2,039,966 | Lochart et al. | May 5, 1936 |
| 2,575,198 | Stickel | Nov. 13, 1951 |
| 2,595,614 | Stickel | May 6, 1952 |
| 2,947,974 | Stickel | Aug. 2, 1960 |

OTHER REFERENCES

"Relay Engineering" by C. A. Packard, published by Struthers-Dunn, Inc., 1945, pp. 115–121 relied on.

"The Design of Switching Circuits" by W. Keister et al., 1951, Van Nostrand Co., pp. 378–381, 421, 422.

UNITED STATES PATENT OFFICE

CERTIFICATE OF CORRECTION

Patent No. 3,074,051 January 15, 1963

Herbert M. Penningroth

It is hereby certified that error appears in the above numbered patent requiring correction and that the said Letters Patent should read as corrected below.

Column 1, line 40, for "circuits" read -- circuit --; column 5, line 23, for "came" read -- cam --; line 39, after "return" insert -- motion --; same column 5, line 67, strike out "said one side of", and insert the same before "the", second occurrence, in line 66, same column 5.

Signed and sealed this 8th day of October 1963.

(SEAL)
Attest:

EDWIN L. REYNOLDS

ERNEST W. SWIDER
Attesting Officer

Acting Commissioner of Patents

UNITED STATES PATENT OFFICE

CERTIFICATE OF CORRECTION

Patent No. 3,074,051 January 15, 1963

Herbert M. Penningroth

It is hereby certified that error appears in the above numbered patent requiring correction and that the said Letters Patent should read as corrected below.

Column 1, line 40, for "circuits" read -- circuit --; column 5, line 23, for "came" read -- cam --; line 39, after "return" insert -- motion --; same column 5, line 67, strike out "said one side of", and insert the same before "the", second occurrence, in line 66, same column 5.

Signed and sealed this 8th day of October 1963.

(SEAL)
Attest:

ERNEST W. SWIDER
Attesting Officer

EDWIN L. REYNOLDS
Acting Commissioner of Patents